(12) United States Patent
Rivadeneira

(10) Patent No.: US 8,786,899 B2
(45) Date of Patent: Jul. 22, 2014

(54) CONVERSION ARRAYS FOR PRINT IMAGE DATA TRANSFORMATION

(75) Inventor: Randell Rivadeneira, Broomfield, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 783 days.

(21) Appl. No.: 13/015,770

(22) Filed: Jan. 28, 2011

(65) Prior Publication Data

US 2012/0194831 A1 Aug. 2, 2012

(51) Int. Cl.
*G06F 15/00* (2006.01)
*G06F 3/12* (2006.01)

(52) U.S. Cl.
CPC ............ *G06F 3/1244* (2013.01); *G06F 3/1213* (2013.01)
USPC .......................................................... 358/1.9

(58) Field of Classification Search
None
See application file for complete search history.

(56) References Cited

U.S. PATENT DOCUMENTS

| | | | |
|---|---|---|---|
| 5,553,200 A | 9/1996 | Accad | |
| 5,710,577 A | 1/1998 | Laumeyer | |
| 5,748,860 A | 5/1998 | Shively | |
| 5,920,274 A | 7/1999 | Gowda et al. | |
| 6,342,950 B1 | 1/2002 | Tabata et al. | |
| 6,429,948 B1 | 8/2002 | Rumph et al. | |
| 6,757,438 B2 | 6/2004 | Graffagnino | |
| 6,987,536 B2 | 1/2006 | Olding et al. | |
| 7,362,355 B1 | 4/2008 | Yang et al. | |
| 2002/0097408 A1 | 7/2002 | Chang et al. | |
| 2005/0213128 A1* | 9/2005 | Imai et al. | ........................ 358/1.9 |
| 2007/0081192 A1* | 4/2007 | Tai et al. | ........................ 358/3.06 |
| 2009/0087111 A1 | 4/2009 | Noda et al. | |

FOREIGN PATENT DOCUMENTS

EP 0584690 A1 3/1994

OTHER PUBLICATIONS

Adobe Systems Incorporated Ed—Adobe Systems Incorporated: "PostScript Language Reference, Chapter 4 (Graphics)", ! Jan. 1999 (Jan. 1, 1999), Postscript Language Reference; [Red Book], Addison-Wesley, Reading, Mass. [U.A.], pp. 175-311, XP002639735, ISBN: 978-0-201-37922-8.

* cited by examiner

*Primary Examiner* — Jeremiah Bryar
(74) *Attorney, Agent, or Firm* — Duft Bornsen & Fettig LLP

(57) ABSTRACT

Systems and methods for using conversion arrays to transform image in print jobs to different color depths. In one embodiment, the system stores a plurality of conversion arrays for converting images of print jobs encoded according to a page description language. The system receives a print job encoded according to the page description language, locates an image in the encoded print job, and identifies an existing color depth of the image, a pel color range, and a desired output color depth for the image. The system further selects a conversion array from the memory based on at least one of the existing color depth of the image, the pel color range, and the desired output color depth, and converts the image from the existing color depth of the image to the desired output color depth using the conversion array. The system further transmits the converted image for printing.

20 Claims, 5 Drawing Sheets

CONVERSION ARRAYS FOR PRINT IMAGE DATA TRANSFORMATION

RELATED APPLICATIONS

This application is related to commonly owned U.S. patent application Ser. No. 12/878,566, filed Sep. 9, 2010, entitled "print data transformation using conversion arrays," which is hereby incorporated by reference.

FIELD OF THE INVENTION

The invention relates to the field of printing, and in particular, to print job processing using conversion arrays.

BACKGROUND

Printing systems receive, process, and print incoming print jobs. Print jobs include data that describes the location and intensity of pels printed on the page, and print jobs may be received in specialized formats known as page description languages (PDLs). Elements of a print job encoded according to a PDL are translated into a rasterized format before they are printed.

Images within a print job are one of the elements of a print job that may be converted. Generally, conversion of an image to a format preferred by a print engine may be a processing-intensive process, as each pel in the image is converted by solving a conversion formula. Processing resources are often at a premium in a printing system, and converting large images on a pel-by-pel basis with a computationally intense conversion formula results in long rasterization times, which in turn reduces the speed at which the print job is printed. Therefore, users of printing systems wish to increase the processing speed for images within a PDL encoded print job.

SUMMARY

Embodiments described herein find images within print jobs and convert them from an existing color depth to a desired output color depth by selecting a pre-computed conversion array, and using the conversion array instead of a conversion formula to translate incoming image data. Because the conversion array includes pre-computed formula results that are used to convert pels, there is no need to solve a computationally intensive formula each time a pel is converted. Thus, instead of solving a complex equation to convert each pel, a simple operation (e.g., a lookup in memory) can be used to convert pels. Thus, conversion arrays substantially increase the speed at which an image may be converted. Conversion arrays may be selected based upon the existing color depth of the image, a pel color range, and a desired output color depth. Using a conversion array of pre-computed values reduces processor load during the conversion process, because computationally intensive formulas can be replaced with lookup operations that use fewer system resources. This in turn increases the speed at which a print job can be rasterized and printed.

One embodiment is a system that converts images within print jobs to different color depths. The system includes a memory that stores a plurality of conversion arrays for converting images of print jobs encoded according to a page description language. The system also includes a control unit that receives a print job encoded according to the page description language, locates an image in the encoded print job, and identifies an existing color depth of the image, a pel color range, and a desired output color depth for the image. The control unit selects a conversion array from the memory based on at least one of the existing color depth of the image, the pel color range, and the desired output color depth for the image, and converts the image from the existing color depth to the desired output color depth using the selected conversion array. The control unit further transmits the converted image for printing.

Another embodiment is a method for converting images of print jobs to different color depths. According to the method, a print job is received that is encoded according to a page description language, and an image in the encoded print job is located. An existing color depth of the image, a pel range, and a desired output color depth for the image are identified, and a conversion array is selected based on at least one of the existing color depth of the image, the pel range, and the desired output color depth. The image is converted from the existing color depth to the desired output color depth using the selected conversion array, and is transmitted for printing.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
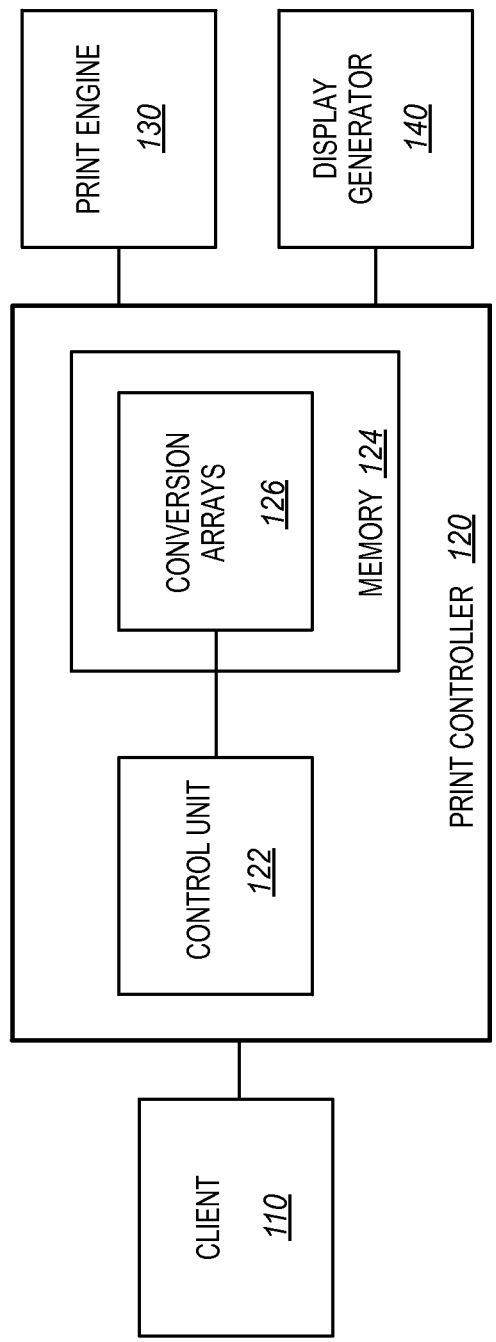
FIG. 1 is a block diagram of a print controller in an exemplary embodiment.

FIG. 1 is a block diagram of a print controller 120 in an exemplary embodiment. Print controller 120 comprises control unit 122 and memory 124, and is operable to communicate with client 110, print engine 130, and display generator 140. Control unit 122 comprises any system, device, or component operable to receive incoming print jobs from client 110 and prepare the print jobs for printing. Memory 124 comprises any system or device operable to store data, and includes conversion arrays 126.

Further details of the operation of print controller 120 will be discussed with regard to FIG. 2. Assume, for this embodiment, that control unit 122 receives print jobs from client 110 that are encoded according to a page description language. The print jobs include images that will be converted to a new color depth (color depth describes the number of bits used to represent a single pel in an image). Control unit 122 locates each image in the print job, and selects a conversion array to use to convert each image. The conversion arrays may be selected based upon the input color depth of the images, the desired output color depth, and a pel color range for the images. Control unit 122 then uses the selected conversion arrays to convert the images, and transmits the converted images to print engine 130 for printing and/or display generator 140 for display to a user. Using a conversion array of pre-computed values reduces processor load during the conversion process, because computationally intensive formulas can be replaced with lookup operations that use less system resources. This in turn increases the speed at which a print job can be rasterized and printed.

Figure 2:
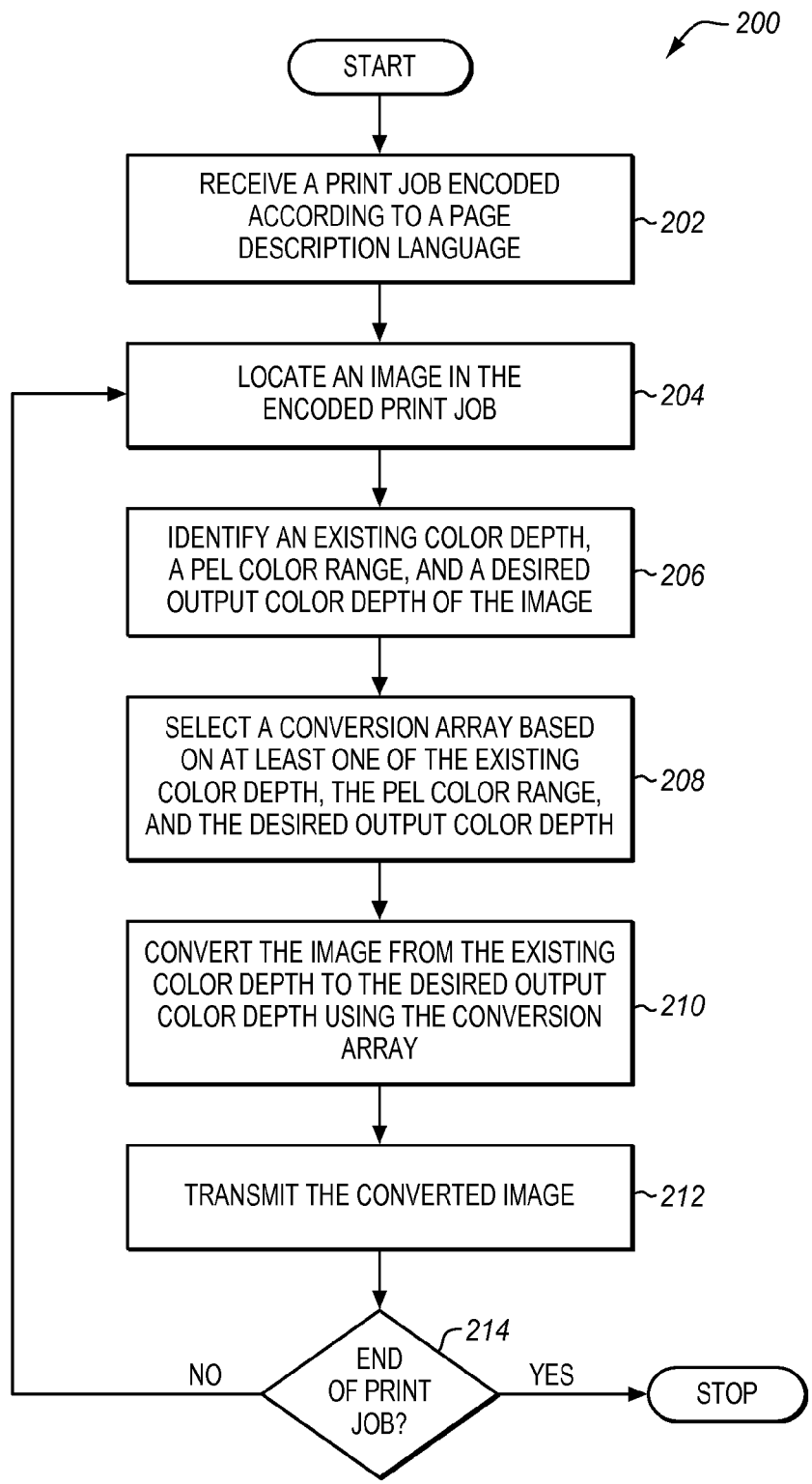
FIG. 2 is a flowchart illustrating a method for converting an image of a print job to a new color depth in an exemplary embodiment.

FIG. 2 is a flowchart illustrating a method 200 for converting an image of a print job to a new color depth in an exemplary embodiment. The steps of method 200 are described with reference to print controller 120 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control unit 122 receives a print job encoded according to a page description language (PDL) from client 110. Examples of PDLs include PostScript, Advanced Function Presentation (AFP), Printer Command Language (PCL), and XML Paper Specification (XPS).

In step 204, control unit 122 locates an image in the encoded print job. An image in the print job may be located by control unit 122 when control unit 122 parses header information in the print job that describes the image. An image may also be located based upon other information in the print job that indicates where image data is stored (e.g., an index indicating the locations of images in the print job).

In step 206, control unit 122 identifies an existing color depth, a pel color range, and a desired output color depth of the image. Color depth describes the number of bits used to represent a single pel in an image. Common color depth values include 1, 2, 4, 8, 12, 16, 18, 24, and 32 bits per pel. The phrase "color depth" is not meant to imply that only color images are converted in method 200. Rather, color depth simply describes the number of bits used to define the color of a pel in the image. Indeed, grayscale images may be converted from one color depth to another and may still remain grayscale. It may be desirable to convert images to a new color depth for a number of reasons. For example, print engine 130 or display generator 140 may require a color depth that is different than the existing color depth of the image. For example, print engine 130 may print at a greater or lesser color depth than the image is currently encoded at. The color depth to which the image is converted is known as the desired output color depth.

The pel color range indicates the range of values that a pel of the image has before it is converted. Often, the pel color range is defined by a minimum color density value ($D_{min}$) and a maximum color density value ($D_{max}$). Common values for ($D_{min}$, $D_{max}$) are (−1, 1), (0, 1), and (0, 255). Each pel in the image uses the number of bits in the color depth to indicate a value in the pel color range. For example, if the pel color range is (0, 1), and the existing color depth is eight bits, then eight bits will be used to represent each pel in the original image, and the eight bit value for each pel will represent a number between zero and one, inclusive.

Control unit 122 may identify the existing color depth and the pel color range by reading header information or metadata in the print job that is associated with the image. Control unit 122 may determine the desired output color depth by querying print engine 130 or accessing memory 124 to find a color depth supported by print engine 130.

In step 208, control unit 122 selects a conversion array from conversion arrays 126 stored in memory 124. The conversion array is selected from conversion arrays 126 based on at least one of the existing color depth of the image to be converted, the pel color range, and the desired output color depth. For example, the combination of these three variables may uniquely identify a conversion array from conversion arrays 126. There may be one conversion array for each different combination of input color depth, desired output color depth, and pel color range. If no conversion array matches a given combination, control unit 122 may be operable to convert the pets of the image using a known conversion formula.

In step 210, control unit 122 converts the image from the existing color depth to the desired output color depth using the selected conversion array. Conversion arrays 126 in memory 124 may be used as lookup tables to convert the image, and an output value may be associated with each set of input bits of image data.

Using a conversion array is beneficial because it reduces the processing load associated with converting each pel of the image when compared with converting image data using a formula. Typically when image data is converted by formula, each pel of the image will be converted from the input color depth to the output color depth by combining multiple image variables in an equation, and then calculating the output value of the equation for a given input value. An example of a conversion formula includes the one listed below, which may be used to convert images in PostScript encoded print jobs.

$$(Output)=(D_{min}+((Input)*(D_{max}-D_{min}))/(2^n-1) \qquad (1)$$

In this equation, n represents the input color depth of the image, Input represents an input value for a pel, and Output represents the output value for the converted pel. Using a conversion array reduces processor load during the conversion process, because computationally intensive formulas can be replaced with lookup operations that use less system resources. This in turn increases the speed at which a print job can be rasterized and printed.

In step 212, control unit 122 transmits the converted image to print engine 130 for printing and/or to display generator 140 for display (e.g., at a screen or monitor). The converted image may be transmitted in its entirety, or it may be transmitted in segments as each portion of the image is converted.

In step 214, control unit 122 parses the data of the print job and determines whether it has reached the end of the print job. If the end of the print job has not been reached, control unit 122 returns to step 204 and attempts to find another image in the print job to convert. Alternatively, if the end of the print job has been reached, control unit 122 finishes processing the print job.

Figure 3:
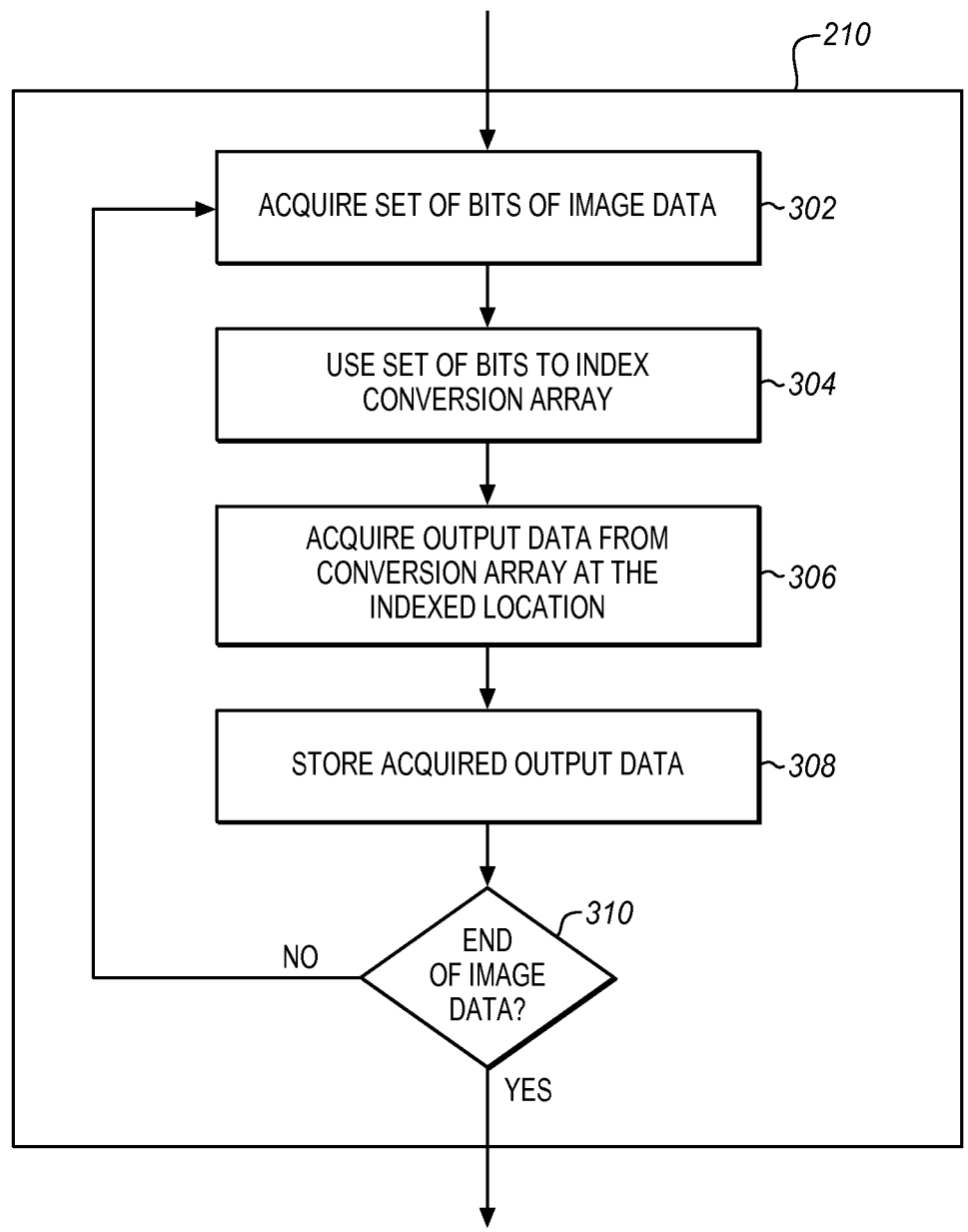
FIG. 3 is a flowchart illustrating additional details of the method of FIG. 2 in an exemplary embodiment.

FIG. 3 is a flowchart illustrating additional details of the method 200 of FIG. 2 in an exemplary embodiment. In particular, FIG. 3 illustrates an implementation of step 210 of FIG. 2, wherein control unit 122 converts the image using the selected conversion array.

In step 302, control unit 122 acquires a set of bits of image data. In this embodiment, the number of bits in the set is equal to the number of bits used in the index of the array (e.g., if the index values are 8-bit, control unit 122 acquires a set of 8 bits of image data). Depending on the existing color depth and number of bits used in the index of the array, the acquired set of bits may comprise multiple pels, or a fraction of a single pel (e.g., if the index values are 8-bit, and the input color depth is 2-bit, then control unit 122 acquires eight bits, comprising four 2-bit pels).

In step 304, control unit 122 uses the set of bits to index the selected conversion array. If the conversion array has multiple indices, each set of bits may be used to determine an index of the array. For example, if the array has two indices, a first set of bits may relate to the first index of the conversion array, while a second set of bits may relate to the second index of the conversion array. The number of indices for a given array can represent the number of dimensions of the conversion array. In one embodiment, the number of indices (N) for a conversion array is represented by the following formula:

$$N = \left(\frac{m}{bu}\right) + \text{ceiling}\left(\frac{n}{bu}\right) \quad (2)$$

wherein m is the output color depth, n is the input color depth, and bu indicates the size, in bits, of indices of the conversion array. Ceiling is an operator that indicates a fraction should be rounded up. Typically, m will be greater than or equal to bu, and m will be evenly divisible by bu. Also, typically n, multiplied by the number of pels in the image, will be evenly divisible by bu.

In step 306, control unit 122 acquires output data from the conversion array at the indexed location. The output data from the conversion array corresponds to the output of the conversion formula for the page description language. For example, formula (1) described above may be used to generate table values for conversion arrays used to convert PostScript image data. If multiple pels are converted at a time, the output data may represent multiple values, one for each pel that has been converted.

In step 308, control unit 122 stores the acquired output data. The output data may be placed in an output buffer for transmission, or the output data may be stored in memory 124 for later use.

In step 310, control unit 122 determines if it has reached the end of image data for the image. The end of the image data may be indicated, for example, with a marker that indicates the image data has ended. Alternatively, the end of the image data may be determined by control unit 122 reading the number of pels in the image from image header data and comparing this to the number of pels that have already been converted. If the end of image data has been reached, control unit 122 proceeds to step 212 of FIG. 2. Otherwise, control unit 122 returns to step 302 to acquire another set of bits to convert.

Figure 4:
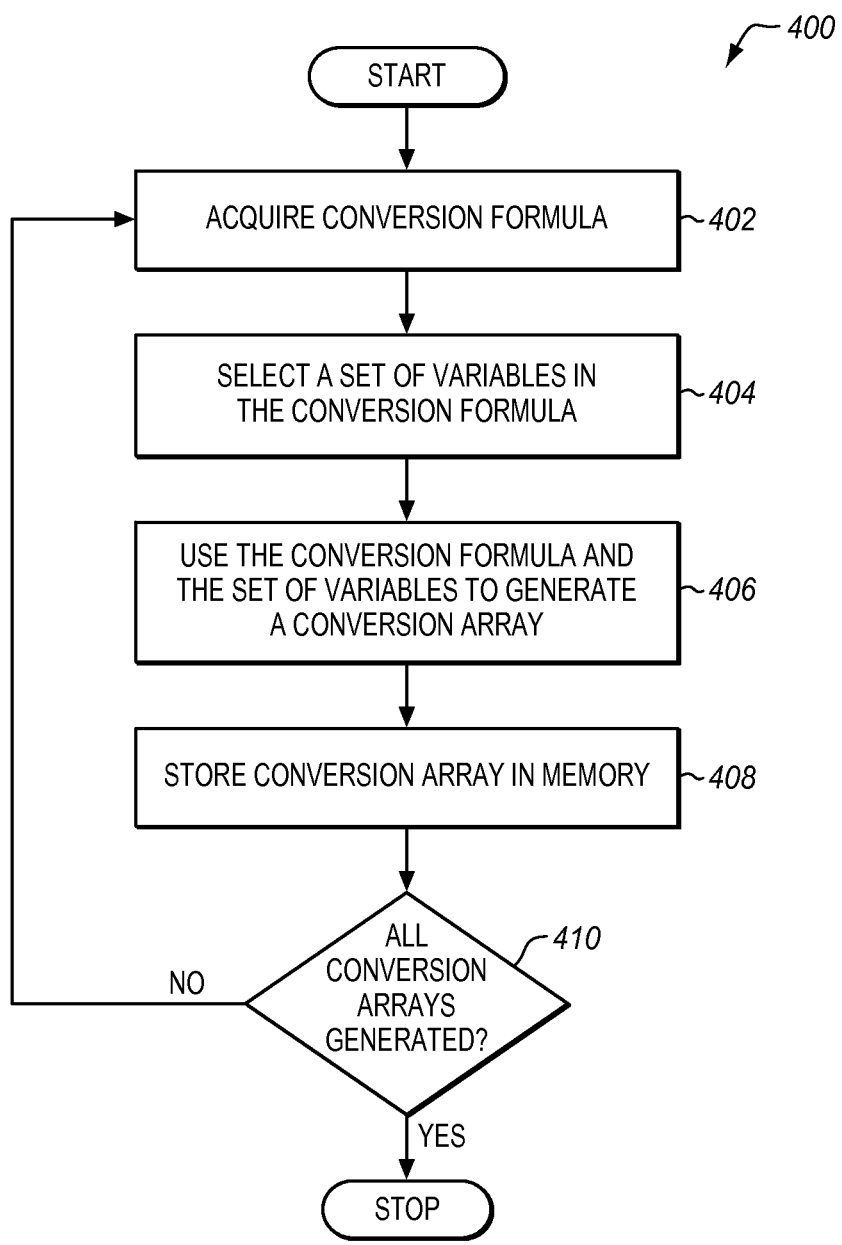
FIG. 4 is a flowchart illustrating a method of generating conversion arrays in an exemplary embodiment.

FIG. 4 is a flowchart illustrating a method 400 of generating conversion arrays in an exemplary embodiment. These generated conversion arrays may be used in the conversion process described above with regard to FIG. 3.

In step 402, control unit 122 acquires a conversion formula for converting pel data from one color depth to another color depth. Conversion formulas may be acquired from client 110, or may be stored internally at memory 124. Conversion formulas generally relate to a specific page description language, such as PostScript. For example, the conversion formula may be formula (1), discussed above.

In step 404, control unit 122 selects a set of variables within the equation. In this embodiment, the set of variables comprises input color depth, output color depth, and a pel color range. The pel color range may be defined by variables $D_{min}$ and $D_{max}$. A value is then chosen for each of these variables.

In step 406, control unit 122 uses the conversion formula and the values for the set of variables to generate a conversion array. Each entry of the conversion array is generated by applying an input value to the conversion formula, and determining the resultant output value. The entry is then indexed (for example, each entry may be indexed as a function of input value). The conversion array includes an output value for each potential input value when the variables are fixed at their chosen values.

In step 408, control unit 122 stores the conversion array in memory 124. In step 410, control unit 122 determines whether all desired conversion arrays have been generated. If more conversion arrays are to be generated, control unit 122 alters the values of the chosen variables and generates a new unique conversion array for these variables. By creating arrays for many different combinations of the selected variables, it is more likely that incoming images can be converted using a conversion array. However, the more conversion arrays that are generated, the more space they occupy in memory 124. Therefore, it may be desirable to only calculate conversion arrays for common combinations of the selected variables.

Example

In this example, additional processes, systems, and methods are described in the context of a print controller 120 operable to use a conversion array to convert image data in a print job. Assume that print controller 120 receives a PostScript encoded print job, and assume that the print job includes only one image. Print controller 120 locates the image in the print job based upon existing information in the print job, where the header information explains the existing color depth of the image and the pel color range of the image. This image is encoded at an existing color depth of two bits, and the pel color range is from zero to one. Print controller 120 references memory 124, and determines that the desired output color depth for the printer is eight bits. Print controller 120 then selects a conversion array based upon this information. In this example, one conversion array exists for the combination of existing color depth of two bits, desired output color depth of eight bits, and pel range of (0, 1). Eight bits are used for each value in the index of this conversion array. Print controller 120 determines that the conversion array has eight bits per index, and acquires samples of image data eight bits at a time. Each sample of acquired image data therefore represents four pels. For each sample of eight bits, print controller 120 finds the index of the array that matches the eight bit value. At this location in the array, a value exists that represents the output value for the four pels. The output value for each sample is thirty-two bits in size, eight bits for each of the four pels. Print controller 120 continues to acquire these eight bit samples and converts them, until the entire image has been converted. As each sample is converted, print controller 120 transmits the output data to a buffer, and data from the buffer is transmitted to print engine 130 for printing.

Figure 5:
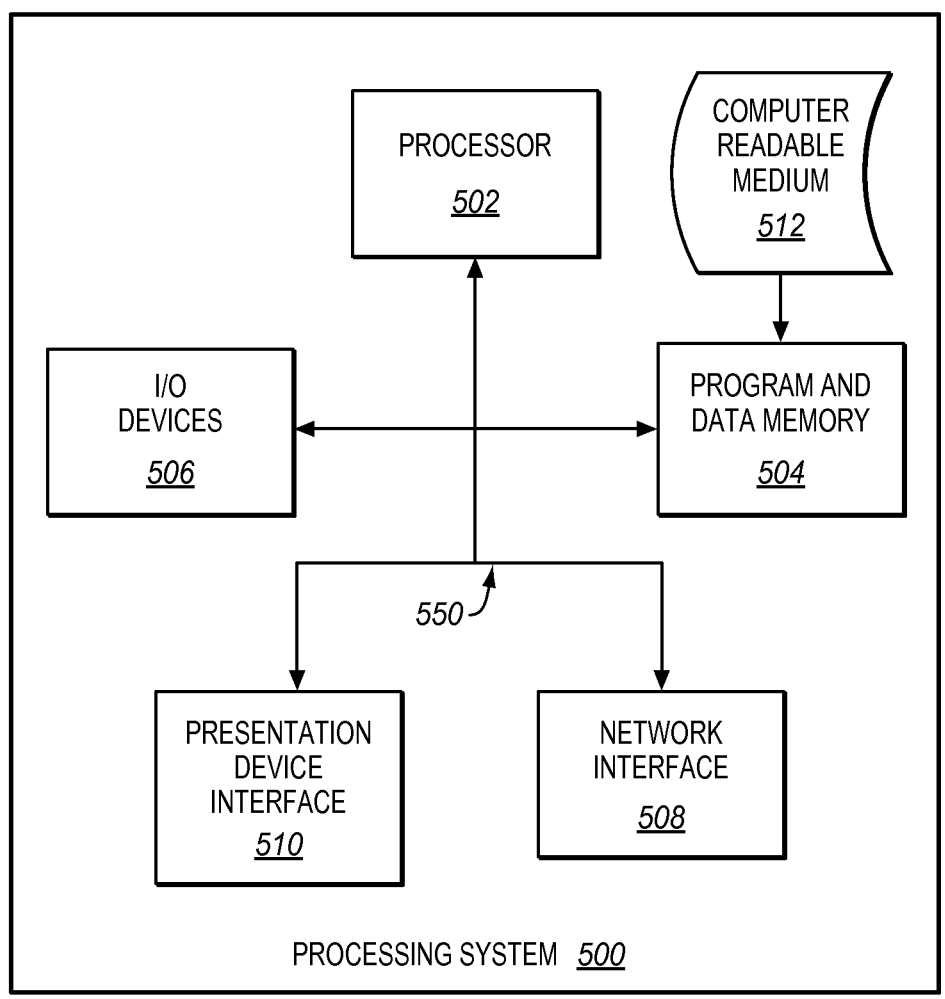
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print controller 120 to perform the various operations disclosed herein. FIG. 5 illustrates a processing system operable to execute a computer readable medium embodying programmed instructions to perform desired functions in an exemplary embodiment. Processing system 500 is operable to perform the above operations by executing programmed instructions tangibly embodied on a computer readable storage medium 512. In this regard, embodiments of the invention can take the form of a computer program accessible via the computer-readable medium 512 providing program code for use by a computer or any other instruction execution system. For the purposes of this description, a computer readable storage medium 512 can be anything that can contain or store the program for use by the computer.

The computer readable storage medium 512 can be an electronic, magnetic, optical, electromagnetic, infrared, or semiconductor device. Examples of the computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. The memory elements 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

I claim:

1. A print controller comprising:
a memory operable to store a plurality of conversion arrays for converting images of print jobs encoded according to a page description language; and
a control unit operable to receive a print job encoded according to the page description language, to locate an image in the encoded print job, to identify an existing color depth of the image, a pel color range, and a desired output color depth for the image, to select a conversion array from the memory based on at least one of the existing color depth of the image, the pel color range, and the desired output color depth, to convert the image from the existing color depth to the desired output color depth using the selected conversion array, and to transmit the converted image for printing.

2. The print controller of claim 1, wherein the control unit selects the conversion array by referring to the existing color depth of the image, the pel color range, and the desired output color depth for the image.

3. The print controller of claim 1, wherein:
the control unit is further operable to use pel data from the image to index the selected conversion array.

4. The print controller of claim 3, wherein:
the control unit is further operable to acquire pel data from the image in sets of bits, wherein each set of bits is used to identify an index for the selected conversion array, and the number of bits in each set of bits is equal to the number of bits used in the index of the selected conversion array.

5. The print controller of claim 1, wherein:
the control unit is further operable to generate the conversion arrays and store them in the memory.

6. The print controller of claim 5, wherein:
the pel color range is defined by a maximum color density value ($D_{max}$) and a minimum color density value ($D_{min}$).

7. The print controller of claim 6, wherein:
the control unit is further operable to generate the conversion arrays based on $D_{min}$, $D_{max}$, input color depth (n), and output color depth (m).

8. The print controller of claim 7, wherein:
the control unit is further operable to generate entries for the conversion arrays using the following formula, wherein Input is a pel value that is n bits in size, and Output is a pel value that is m bits in size:

$$(\text{Output}) = (D_{min} + ((\text{Input})*(D_{max}-D_{min})/(2^n-1))).$$

9. A method comprising:
receiving a print job encoded according to the page description language;
locating an image in the encoded print job;
identifying an existing color depth of the image, a pel color range, and a desired output color depth for the image;
selecting a conversion array based on at least one of the existing color depth of the image, the pel color range, and the desired output color depth;
converting the image from the existing color depth to the desired output color depth using the selected conversion array; and
transmitting the converted image for printing.

10. The method of claim 9, wherein:
The selected conversion array is selected based on the existing color depth of the image, the pel color range, and the desired output color depth for the image.

11. The method of claim 9, wherein:
converting the image comprises using pel data from the image to index the selected conversion array.

12. The method of claim 11, wherein:
converting the image further comprises acquiring pel data from the image in sets of bits, wherein each set of bits is used to identify an index for the selected conversion array, and the number of bits in each set of bits is equal to the number of bits used in the index of the selected conversion array.

13. The method of claim 9, further comprising:
generating a plurality of conversion arrays, wherein the selected conversion array is selected from the plurality of conversion arrays.

14. The method of claim 13, wherein:
the pel color range is defined by a maximum color density value ($D_{max}$) and a minimum color density value ($D_{min}$).

15. The method of claim 14, wherein:
the conversion arrays are generated based on a minimum color density value ($D_{min}$), a maximum color density value ($D_{max}$), input color depth (n), and output color depth (m).

16. The method of claim 15, wherein:
generating the conversion arrays further comprises using the following formula to generate entries for the conversion arrays, wherein Input is a pel value that is n bits in size, and Output is a pel value that is m bits in size:

$(\text{Output}) = (D_{min} + ((\text{Input}) * (D_{max} - D_{min})/(2^n - 1)).$ 17. A method comprising:
receiving a print job encoded according to a page description language;
locating an image in the encoded print job;
identifying an existing color depth of the image, a pel range, and a desired output color depth of the image;
selecting a conversion array based on at least one of the existing color depth of the image, the pel range, and the desired output color depth for the image;
converting the image from the existing color depth to the desired output color depth using the selected conversion array; and
displaying the converted image at a display.

18. The method of claim 17, wherein:
The conversion array is selected based on the existing color depth of the image, the pel color range, and the desired output color depth for the image.

19. The method of claim 17, wherein:
converting the image comprises using pel data from the image to index the selected conversion array.

20. The method of claim 19, wherein:
converting the image further comprises acquiring pel data from the image in sets of bits, wherein each set of bits is used to identify an index for the selected conversion array, and the number of bits in each set of bits is equal to the number of bits used in the index of the selected conversion array.

* * * * *